United States Patent [19]

Sawata et al.

[11] 4,010,732
[45] Mar. 8, 1977

[54] MULTI-STAGE SYSTEM FOR ACCUMULATION OF HEAT FROM SOLAR RADIANT ENERGY

[75] Inventors: Shinji Sawata, Higashi-Murayama; Tatsuo Tani, Koganei; Takashi Horigome, Tanashi, all of Japan

[73] Assignee: Agency of Industrial Science & Technology, Tokyo, Japan

[22] Filed: Mar. 26, 1975

[21] Appl. No.: 562,196

[30] Foreign Application Priority Data

June 15, 1974 Japan .............................. 49-67646
June 21, 1974 Japan .............................. 49-70298

[52] U.S. Cl. .................................. 126/271; 60/641
[51] Int. Cl.² .................................... F24J 3/02
[58] Field of Search ............ 126/270, 271, 400; 237/1 A; 60/641

[56] References Cited

UNITED STATES PATENTS

| | | | |
|---|---|---|---|
| 1,047,554 | 12/1912 | Nichols | 126/271 |
| 2,460,482 | 2/1949 | Abbot | 126/271 |
| 2,594,232 | 4/1942 | Stockstill | 126/271 |
| 3,125,091 | 3/1964 | Sleeper, Jr. | 126/271 |
| 3,152,442 | 10/1964 | Rowekamp | 126/271 |

FOREIGN PATENTS OR APPLICATIONS

| | | | |
|---|---|---|---|
| 555,420 | 6/1923 | France | 126/270 |
| 282,819 | 10/1971 | U.S.S.R. | 126/271 |

*Primary Examiner*—Kenneth W. Sprague
*Assistant Examiner*—James C. Yeung
*Attorney, Agent, or Firm*—Oblon, Fisher, Spivak, McClelland & Maier

[57] ABSTRACT

In the system for accumulation of heat from solar radiant energy wherein the solar radiant energy is absorbed by heat-absorption means and transferred therefrom to a heat-transfer medium thereby to elevate the temperature of said heat-transfer medium an improvement is attained by using a plurality of heat-absorption members and arranging them in a series connection. These heat-absorption members are individually provided with selectively penetrating membranes capable of reflecting electromagnetic wave energies of the specific magnitudes of heat corresponding to the respective degrees of temperature of the heat-transfer medium. Since the heat-transfer medium is thus divided into a few different stages, the system disclosed herein permits highly efficient accumulation of high-temperature heat energies.

3 Claims, 13 Drawing Figures

MULTI-STAGE SYSTEM FOR ACCUMULATION OF HEAT FROM SOLAR RADIANT ENERGY

BACKGROUND OF THE INVENTION

This invention relates to a system for the accumulation of heat from solar radiant energy. More particularly this invention relates to a system for the accumulation of heat from solar radiant energy adapted to have solar energy absorbed by absorbing means and transferred therefrom to a heat-transfer medium, which system is improved by having said heat-transfer medium divided into a few stages for thereby enabling the heating thereof to be effected in the sequence of said stages.

Of the electromagnetic wave energies, typical is the solar radiant energy. In the orbit of the earth, the mean intensity of solar radiation is about $0.1$ $W/cm^2$ (equivalent to 1,000,000 KW per kilometer), the spectral curve of solar radiant energy has the highest value in the neighborhood of $0.5\mu$ of wavelength and the color temperature thereof is 5900°K. Incidentally, the solar radiant energy may as well be regarded as inexhaustible. If such solar radiant energy can be efficiently and directly harnessed and converted into heat, then the system will serve as a permanent energy source which entails no environmental pollution.

Heretofore various types of solar energy collectors have been proposed (examples being those disclosed in U.S. Pat. Nos. 1,880,938; 2,917,817; 3,176,678; 3,176,679 and 3,227,153).

The present inventors pursued a research and have consequently proposed a system for absorbing solar radiant energy which enables the solar radiant energy to be absorbed at a high percentage and minimizes possible loss of absorbed energy through radiation (U.S. patent application Ser. No. 402,918 abandoned). The proposed system for the absorption of solar radiant energy comprises a highly conductive basal member, a heat absorption member disposed in close contact with the external surface of said basal member, a selectively penetrating membrane permitting passage of only desired wavelengths of the electromagnetic wave energies and disposed on said heat absorption member and a heat-transfer medium circulated inside said highly conductive basal member, whereby the sun's rays are concentratedly irradiated upon the heat absorption member to have the energies absorbed in the form of heat by said heat absorption member, the absorbed heat is conveyed through said highly conductive basal member to said coolant to elevate the temperature thereof and the coolant which now has an elevated temperature is withdrawn and put to use. Said selectively penetrating membrane permits penetration of electromagnetic wave having only wavelengths (about 0.3 to 2.0$\mu$m) contemplated for absorption by the present apparatus and reflects electromagnetic waves of all the other wavelengths. Accordingly, electromagnetic wave energies which have penetrated the membrane are absorbed by the heat absorption member and radiant energies radiated by the heat absorption member are again reflected back to the heat absorption member by the membrane, with the result that electromagnetic energies are absorbed with high efficiency. When it is desired to obtain heat of a high temperature by use of the solar radiant energy absorption system of the one-stage construction described above, it will suffice for this system to be provided with a reflector of a parabolic profile or other similar device designed to concentrate the solar radiant energy impinging upon a wide area into one point. It is actually difficult, however, to obtain heat energies of a high temperature as expected, because the heat-transfer medium fails to effect the desired heat-exchange to a sufficient extent even if it is delivered at once to this focus. The output by the device under discussion will sharply decline when the actual point at which the solar energy are concentrated deviates, though to the slightest extent, from the fixed focus of the parabolic reflector. Also in this respect, it proves difficult to obtain heat of a sufficiently high intensity as the output. Since the angle at which the solar radiant energy impinge upon a given area changes constantly with lapse of time, it is essential that the system be provided with a sun-chasing device adapted for the solar radiant energy to be accurately focused at one fixed point of the reflector at all times. An attempt to obtain heat energies of a high temperature with such one stage system of the aforementioned description is difficult to accomplish and proves disadvantageous from the economic point of view.

The inventors pursued a further study on devices for the absorption of solar energies. They have, consequently, arrived at a discovery that a system in which heating is effected at a few stages of successively elevated temperatures by use of heat-absorption members optimum for respective temperature ranges fixed for said stages so as to obtain heat energies of a desired high temperature finally in the last of said stages is simpler in mechanism, suffers less from possible temperature dispersion and attains the object more easily than the system wherein the heat-transfer medium is heated immediately to a high temperature in one stage.

It is, therefore, an object of this invention to provide a system for the accumulation of heat from the solar energy which permits said energy of a high temperature to be obtained economically.

SUMMARY OF THE INVENTION

To accomplish the object described above, the present invention provides a system for the accumulation of the solar radiant energy adapted to have the solar radiant energy absorbed by heat-absorption means and transferred therefrom to a heat-transfer medium, which system incorporates a few heat-absorption members arranged at different stages in a series connection and provided with selectively penetrating membranes capable of reflecting electromagnetic wave energies optimum for successively elevated temperatures of the heat-transfer medium at said stages, with said heat-absorption members connected in the increasing order ot optimum rated temperature ranges in their respective selectively penetrating membranes. Having the heat-transfer medium divided into a few stages and heated under conditions optimum for the respective rated temperature ranges at said stages as described above, the system according to this invention can obtain heat energies at a desired high temperature with high efficiency.

Other objects and other characteristic features of the present invention will become apparent from the description to be given in further detail hereinbelow with reference to the accompanying drawings.

DETAILED DESCRIPTION OF THE INVENTION

Figure 1:
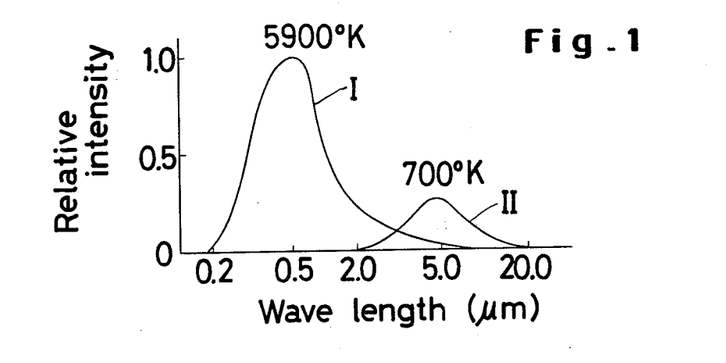
FIG. 1 represents spectral distributions of the solar radiant energy.

The spectrum of solar energy which is representative of electromagnetic wave energies is shown in FIG. 1 (Curve I). In the graph, the vertical axis represents the relative intensity of energy and the horizontal axis the wavelength.

Solar energy has its peak intensity in the neighborhood of a wavelength of $0.5\mu m$ and has a color temperature of $5,900° K$. In said graph, the characteristic of a black body at a color temperature of $700° K$ is shown as Curve II. This Curve II indicates that the fraction of the solar energy corresponding to the color temperature of $700° K$ has a wavelength of about $4.5\mu m$ and that the intensity of energy at this wavelength is extremely small compared with that at a wavelength of about $0.5\mu m$. The greater part of the solar energy is concentrated in the range of wavelengths between 0.3 and $2\mu m$. The solar energy showered upon every square 1Km of the earth's surface lying perpendicularly to the sun's rays is close to about 1,000,000 KW. If this electromagnetic wave energy is efficiently absorbed in the form of heat of high temperature, it can be utilized as an infinite pollution-free energy source requiring no fuel.

Figure 2:
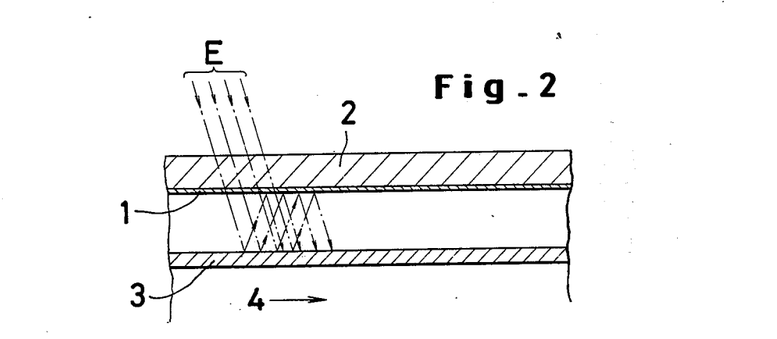
FIG. 2 represents an enlarged view of the cardinal portion of a heat-absorption member used for absorbing the solar radiant energy.
Figure 3:
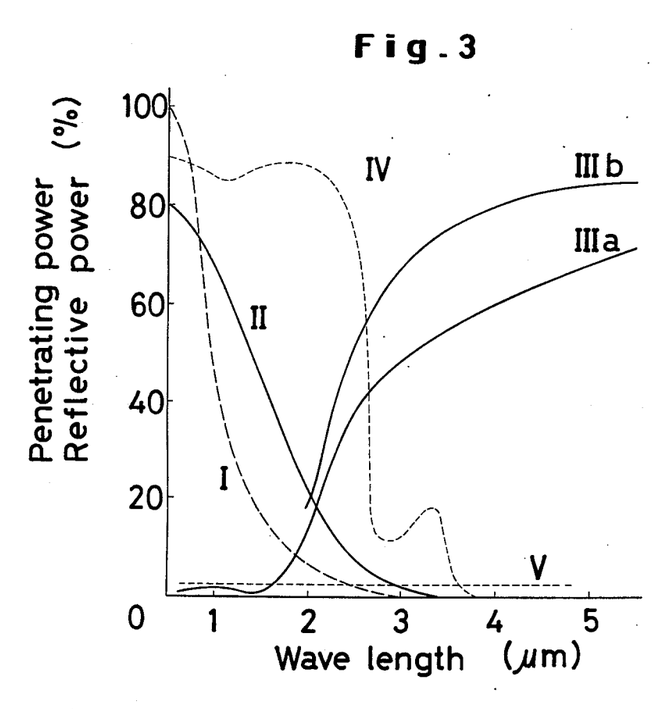
FIG. 3 is a graph illustrating the properties, indices of penetration and reflection, of a selectively penetrating membrane for use in said heat-absorption member.

In view of the foregoing state of affairs, the inventors have proposed a solar energy absorption device which absorbs the solar radiant energy at a high percentage and suffers very little loss of the absorbed energy through radiation. FIG. 2 is an enlarged sectional view of a selectively penetrating membrane 1 which is used in said absorption device. The upper side of this selectively penetrating member 1 is covered with a glass sheet 2. When the solar energy absorption device of such construction is irradiated with the solar radiant energy E, a substantial part of the energy penetrates through the selectively penetrating membrane 1. The energy which has penetrated the membrane is absorbed by the heat-absorption member 3 disposed inside. The heat-absorption member 3 which has consequently gained in temperature is then cooled as it releases the heat to a coolant 4 flowing thereunder and, thereupon, radiates a radiant energy of a greater wavelength than that of the incoming energy. The radiated energy, however, is reflected by said selectively penetrating membrane 1 to be absorbed again by the heat-absorption member 3. A typical condition of said radiation and subsequent reabsorption is represented by the curve II in the diagram of FIG. 1. In this manner, absorption of the solar radiant energy can be effected efficiently. The selectively penetrating membrane 1 may be constructed in a single layer or in a multiplicity of layers. Alternatively, it may be made in the shape of a metallic lattice like mesh, with the size of meshes selected so as to suit the wavelength of the electromagnetic wave energy desired to be passed. The selectively penetrating membrane of this construction will permit passage of electromagnetic wave energies of a specific wavelength only. As the material for the metallic mesh, there can be used various metals such as, for example, gold, tin, aluminum and antimony. The selectively penetrating membrane 1 having any of the properties shown in FIG. 3 can be obtained by combining films of different metals or by selecting the thickness of such films suitably. In FIG. 3, the horizontal axis represents the wavelength (in $\mu m$) and the vertical axis the index of penetration and reflection (in %). In the graph, the curve I indicates the relative distribution of the solar radiant energy, the curve II the index of penetration in the selectively penetrating membrane, the curve IIIa the index of reflection of the selectively penetrating membrane of Sn–1% Sb system satisfying $nh = 0.68\mu m$ ($n$ : index of diffraction and $h$ : thickness), the curve IIIb the index of reflection of the selectively penetrating membrane of Sn–30% F satisfying $nh = 0.83\mu m$, the curve IV the index of penetration of glass and the curve V the index of reflection of glass respectively.

Now, a description will be made of the heat-absorption member to be used in said device.

As the heat-absorption member, there may be used what is obtained by depositing blackbody or some other substance having an equal index of absorption on the surface of a basal metal such as of copper or stainless steel. The desired heat absorption can be attained more efficiently by using heat-absorption members especially designed to provide improved absorption efficiency. Examples are a light-heat conversion cell whereby the incident solar radiant energy is caused to fall on a junction of $n$ and $p$ semiconductors to generate heat through the phenomenon of thermal oscillation and, in the case of a short wavelength, to liberate secondary photons and the electrons excited by said photons cause a flow of short-circuit electric current in the conductor to bring about generation of Joule's heat which is accumulated directly in its unmodified form of heat and a modulation type light-heat conversion system which is obtained by conferring upon said light-heat conversion cell an additional function to obtain harmony with the electromagnetic wave energy expected to be absorbed.

A typical apparatus for the absorption of the solar radiant energy which is composed of the selectively penetrating membrane and the heat-absorption member described above is illustrated in FIG. 4. In the diagram, 1 denotes the selectively penetrating membrane disposed on the internal wall of the glass cylinder 2 whose interior is maintained under vacuum (of the order of $10^{-3}$ to $10^{-4}$ Torr., for example). The heat-absorption member 3 is disposed inside the cylinder. In the interior of the heat-absorption member 3, a gaseous or liquid heat-transfer medium 4 flows to conduct the heat accumulated by the heat-absorption member 3 out of the member. As the heat-transfer medium there is used $CO_2$, $H_2O$, Na, NaK or other similar substance. Denoted by 5 is a converging lens such as a convex lens or fresnel lens. By the apparatus of this construction, the solar radiant energy E is converged, passed through the selectively penetrating membrane 1 and allowed to impinge upon the heat-absorption member 3 to be absorbed thereby. And a part of the solar radiant energy which has escaped being absorbed and the energy which has been radiated by the heat-absorption member 3 are both reflected by the selectively penetrating membrane 1 to impinge upon the heat-absorption member 3 again. Since this cycle of radiation and reabsorption is repeated, the greater part of the solar radiant energy E is finally absorbed by the heat-absorption member 3.

Figures 4, 5:
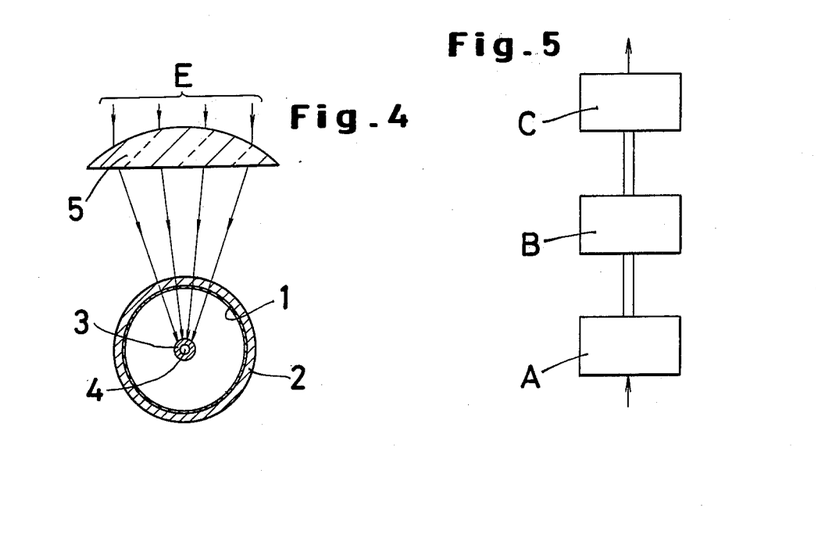
FIG. 4 is an explanatory diagram indicating the condition in which the solar radiant energy are absorbed.
FIG. 5 is an explanatory diagram indicating the pattern of heat accumulation according to the present invention.

A study of the process of temperature elevation which occurs in the heat-transfer medium 4 of the aforementioned apparatus for the absorption of the solar radiant energy shows that the heat-transfer medium 4 which has entered the heat-absorption member 3 at one end thereof gradually gains in temperature as it flows through said member and it is discharged at an elevated temperature from the other end. It follows as a consequence that the temperature of the heat-transfer medium 4 is fairly different at the inlet and at the outlet and, for this reason, the heat-absorption member 3 itself has a temperature gradient. This means that the wavelength of the solar radiant energy to be radiated from the heat-absorption member 3 similarly differs at the first part and at the last part of the member 3. As is evident from the foregoing explanation, if the properties of the selectively penetrating membrane 1 are rendered uniform throughout the entire length of the heat-absorption member 3, then there may be entailed a disadvantage that the amount of the solar radiant energy lost through radiation will increase to an extent of inpairing the overall efficiency of the apparatus.

The present invention has been developed with a view to eliminating the disadvantages described above. The present invention will be described specifically hereinbelow.

FIG. 5 represents a block diagram indicating the principle of the layout of the temperature-elevation system for the purpose of this invention. In the diagram, A denotes a heat-absorption unit of the preheating stage which possesses a selectively penetrating membrane capable of reflecting electromagnetic wave energy of a low temperature, B a second-stage heat-absorption unit which serves the purpose of elevating to a heat energy of an increased temperature the heat-transfer medium received in a preheated state from the heat-absorption unit and which, for tbat purpose, possesses a selectively penetrating membrane capable of reflecting electromagnetic wave energy of a higher temperature than that of the heat-absorption unit A. C denotes a heat-absorption unit which functions to elevate the heat-transfer medium to a heat energy of the high temperature desired to be attained and, for this purpose, possesses a selectively penetrating membrane capable of reflecting electromagnetic wave energy of a still higher temperature than that of the heat-absorption unit B. These heat-absorption units A, B and C are arranged in a series connection. While the heat-transfer medium is sent through the three units, it is preheated to 200°C, for example, during its travel through the unit A, then to 600° C during its passage through the unit B and finally to 1,200° C during its flow through the unit C.

Figure 6:
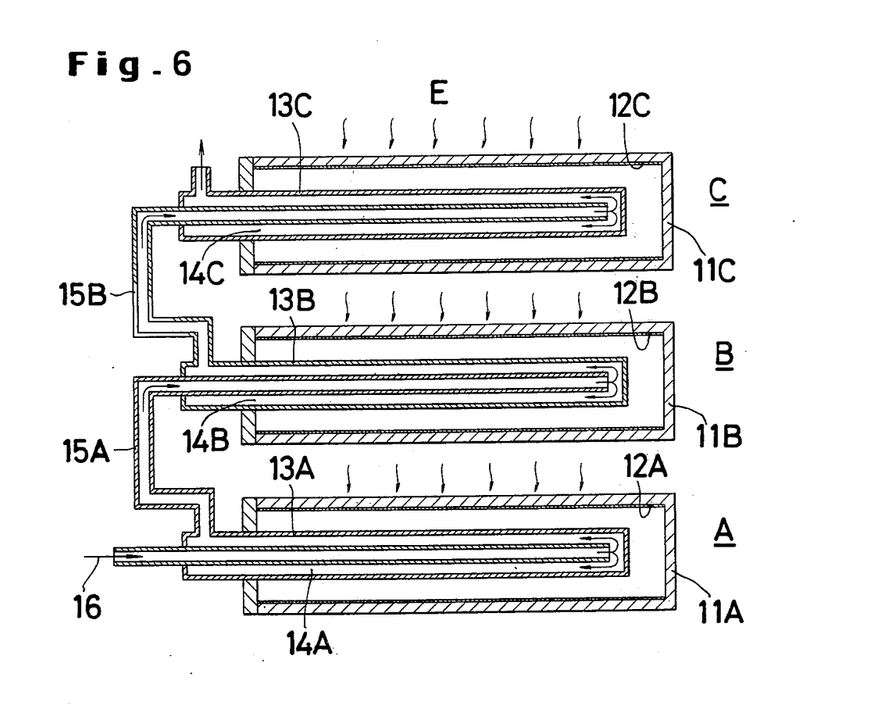
FIG. 6 represents a sectional view of one preferred embodiment of the system for heat accumulation according to the present invention.

FIG. 6 illustrates one preferred embodiment of the present invention, wherein A, B and C denote heat-absorption capsules similar in construction. Selectively penetrating membranes 12A, 12B and 12C are formed on the inner faces of transparent vacuum containers 11A, 11B and 11C respectively and heat-absorption members 13A, 13B and 13C are disposed respectively inside said vacuum containers 11A, 11B and 11C. Inside the heat-absorption members 13A, 13B and 13C, there are concentrically disposed pipes 14A, 14B and 14C. The interior of the heat-absorption member 13A and the pipe 14B are connected via a pipe 15A and the interior of the heat-absorption member 13B and the pipe 14C are connected via a pipe 15B.

What is important in this connection is the fact that the selectively penetrating membranes 12A, 12B and 12C disposed in the different heat-absorption capsules be not possessed of equal properties but capable of reflecting electromagnetic wave energies of successively shorter wavelengths. Specifically, as the heat-transfer medium 16 is supplied through the pipe 14A, it reverses the direction of its flow at the extremity of the pipe 14A to advance through the opening between the heat-absorption member 13A and the pipe 14A and gradually gain in temperature, then departs from the heat-absorption member 13A and enters the pipe 14B through the pipe 15A. In much the same way, it is heated during its travel through the heat-absorption capsule B and further heated during its flow through the heat-absorption capsule C eventually to be elevated to the temperature desired to be attained. The heat-transfer medium thus elevated to the target temperature is discharged as the output. As described above, the heat-transfer medium 16 has different degrees of temperature in the heat-absorption capsules A, B and C. If the selectively penetrating membranes 12A, 12B and 12C are possessed of equal properties, the solar radiant energy cannot efficiently be entrapped inside the heat-absorption capsules A, B and C, with the result that some of the absorbed solar radiant energy escapes from the system through radiation.

Figure 7:
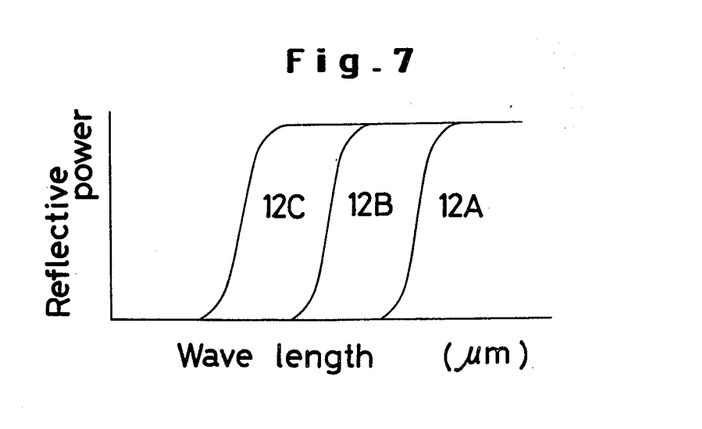
FIG. 7 is a graph indicating the properties, i.e. wavelength and index of reflection, of the selectively penetrating membrane for use in the present invention.

To preclude this possibility, therefore, the properties of the selectively penetrating mambranes 12A, 12B and 12C are differentiated as indicated in FIG. 7. In this diagram, the horizontal axis represents the wavelength and the vertical axis the index of reflection and the curves 12A, 12B and 12C indicate the properties of the selevtively penetrating membranes 12A, 12B and 12C respectively. This diagram clearly indicates that the selectively penetrating membrane 12B is capable of reflecting and entrapping electromagnetic wave energies of a shorter wavelength than that of electromagnetic wave energies reflected and entrapped by the membrane 12A and, by the same token, the membrane 12C is capable of reflecting and entrapping electromagnetic wave energies of a shorter wavelength than that of electromagnetic wave energies reflected and entrapped by the membrane 12B.

The overall efficiency of the system under discussion can be notably improved by using the selectively penetrating membranes 12A, 12B and 12C which have properties optimum for the respective rated degrees of temperature of the heat-transfer medium 16 in the different capsules as illustrated in FIG. 6. The individual properties for the selectively penetrating membranes 12A, 12B and 12C can be determined in accordance with the principle set forth with reference to FIG. 3.

One example of the method followed for the manufacture of selectively penetrating membranes of the aforementioned description will be cited:

Indium or tin is uniformly deposited on the inner surface of a glass pipe in accordance with the vacuum evaporation coating method. The glass pipe is introduced into an electric furnace, heated to a temperature in the range of from 320° to 350° C and subjected to gradual forced oxidation. Accordingly, an indium oxide membrane, tin oxide membrane or membrane composed of a mixture of these substances is formed on the inner surface of the glass pipe.

Electromagnetic wave energy having a temperature above 150° C is reflected by a membrane having a thickness of about 1,000A. When a membrane of such thickness produced in the manner described above is applied to the heat-absorption apparatus A as a selectively penetrating membrane, the heat-transfer medium can be heated up to about 130° C. If the thickness of the membrane is made 2,000A, electromagnetic wave energy having a temperature above 300° C is reflected by the membrane. Accordingly, when such a membrane is applied to the heat-absorption apparatus B as a selectively penetrating membrane the heat-transfer medium can be heated up to about 250° C. Similarly, if the width of the membrane is 3,200A, electromagnetic wave energy having a temperature above 600° C is reflected by the membrane. Accordingly, when such a membrane is applied to the heat-absorption apparatus C as a selectively penetrating membrane the heat-transfer medium can be heated up to about 550° C.

In this way, it is possible to effectively obtain heat energy of a high temperature.

Figure 8:
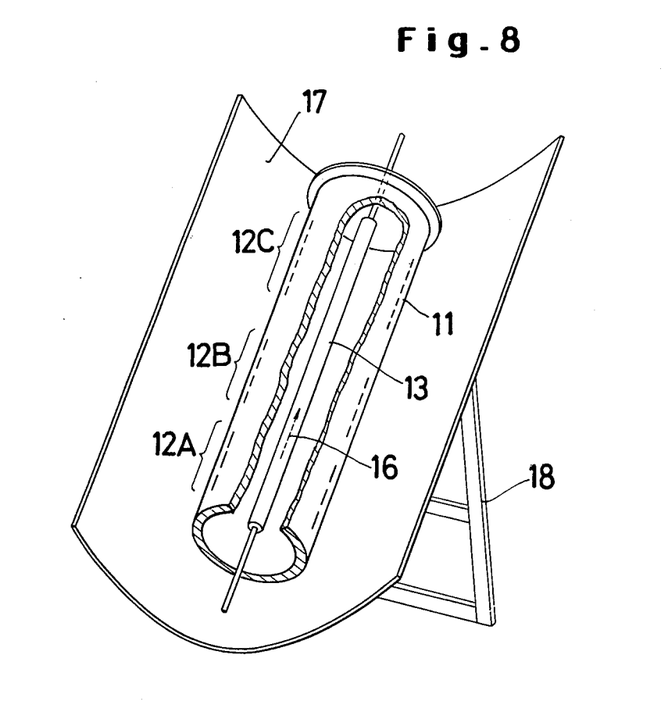
FIG. 8 is a perspective view illustrating another preferred embodiment of the system for heat accumulation according to this invention.

FIG. 8 illustrates another preferred embodiment of the present invention, wherein selectively penetrating membranes 12A, 12B and 12C are formed continuously in the order mentioned on the inner face of a transparent vacuum container 11 and heat-absorption member 13 is disposed inside said vacuum container 11, with the interior of said member 13 adapted to permit flow of the heat-transfer medium 16. And 17 denotes a curved reflecting mirror of a parabolic cross section and 18 denotes a prop for supporting the mirror in position. As the heat-transfer medium 16 travels upwardly through the heat-absorption member 13, it gains in temperature increasingly more in the upward direction. Thus, the properties of the selectively penetrating membranes 12A, 12B and 12C have only to be selected in the similar relationship as described above with reference to FIG. 5.

The selectively penetrating membranes used in the preferred embodiments cited above invariably have their properties varied stepwise. If there are used those membranes whose properties are continuously varied in conformity with the gradient of temperature elevation, then the system may be expected to perform with much more improved efficiency.

When heat-absorption devices provided with selectively penetrating membranes which are capable of reflecting electromagnetic wave energies optimum for the respective rated degrees of temperature of the heat-transfer medium at the different stages are arranged in a series connection as described above, the desired accumulation of the heat energies of high temperature can be attained with enhanced efficiency by differentiating the individual heat-absorption devices in terms of the method for absorption of the solar radiant energy.

Where heat energies of high temperature are to be obtained by efficient absorption of the solar radiant energy, for example, it will suffice for the purpose to utilize parabolic reflecting mirrors each adapted to concentrate the solar radiant energy at one point and allow the foci to fall on the respective heat-absorption devices in use.

In such point-focussing type heat-absorption devices, the points at which the solar radiant energy is concentrated tend to deviate from the fixed foci of the reflecting mirrors and, consequently, cause the absorption efficiency of the solar radiant energy to be impaired to an extreme extent. Thus, the point-focussing type heat-absorption device should be possessed of a chasing mechanism of high precision enough for the solar radiant energy to be focussed at a fixed point at all times. Moreover, it requires the highest technical level and is limited in terms of dimensions on account of the precision of curvature achievable at all. Where the heat-absorption in a fixed area is considered, therefore, this method of absorption of the solar radiant energy proves to be most expensive. In addition, this method has no sufficient reliability from the long range of view and entails difficulty from the standpoint of mechanical performance or maintenance. It is, therefore, wise to adopt a plane-focussing type light-absorption device for the preheating-stage unit which suffers a relatively small loss of energy for the whole system, a line-focussing type light-absorption device for the second-stage heat-absorption unit, and a point-focussing type light-absorption device for the last-stage heat-absorption unit.

Heat-absorption apparatuses utilizing such methods of light-absorption will be described with reference to FIGS. 9 through 12.

Figures 9A, 9B:
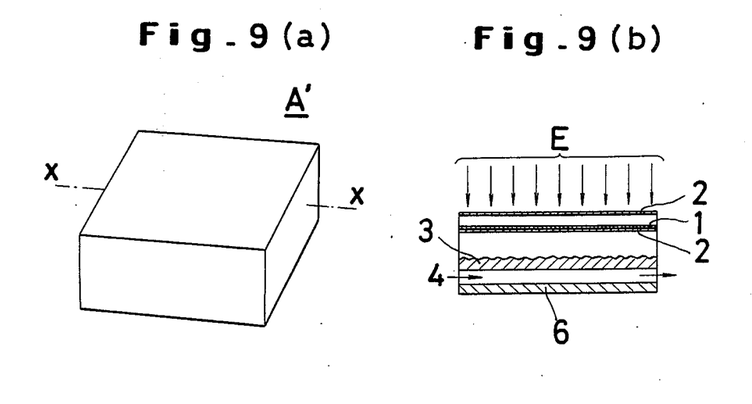
FIGS. 9 through 11 are explanatory diagrams indicating devices for the concentration of the solar radiant energy for the purpose of the present invention.

FIGS. 9(a) and (b) are a perspective view and a sectional side view respectively of a flat type of plane-focussing type heat-absorption apparatus A' for use in the preheating stage. In FIG. 9(b), 2 denotes each of two glass plates and 1 each of two selectively penetrating membranes formed on the inner faces of said glass plates. The interior of the glass plates is maintained under a low pressure to prevent release of thermal energy. Denoted by 3 is a heat-absorption member serving to absorb the solar radiant energy E. In the illustrated embodiment, there is used a heat-absorption member capable of a temperature elevation to the level of 150° – 200° C suitable for use in the preheating stage. As the selectively penetrating membrane, there is used a membrane capable of reflecting radiant energies of a temperature of 200° C. The temperature of the heat-transfer medium 4 is elevated by the heat energy which is absorbed by this heat-absorption member 3. Reference numeral 6 denotes a heat-insulation material.

Since the heat-absorption member 3 which is used in the heat-absorption apparatus A' is in the shape of a flat plate, the area on which the solar radiant energy E impinges is large and the selectively penetrating membrane 1 is also large proportionally. The loss of output per unit area increases with the increasing area of the selectively penetrating membrane 1. Therefore, this heat-absorption apparatus A' has inferior efficiency and cannot be expected to provide any temperature elevation beyond a certain level. Thus, it is proposed to be used as the first-stage preheating unit. The output of this unit is then forwarded to the heat-absorption apparatus B' for the second stage.

Figure 10:
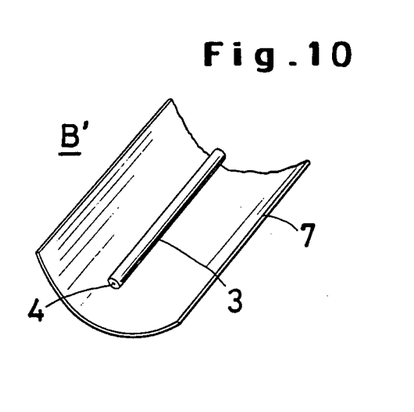

FIG. 10 represents a perspective view of the heat-absorption apparatus B' having a curved reflecting mirror for use in the second stage, wherein 7 denotes a reflecting mirror which is utilized in lieu of a convex lens or fresnel lens 5 of the type to be used in the heat-absorption device described previously with reference to FIG. 4. As the solar radiant energy E impinges upon the reflecting mirror 7, the portion of the solar radiant energy which is reflected on the mirror surface is absorbed by the heat-absorption member 3. The absorbed heat energy is transferred to the heat-transfer medium 4 flowing inside the heat-absorption member 3 and consequently conveyed to the subsequent stage. Since the reflecting mirror 7 of this heat-absorption apparatus B' has a cylindrical reflecting surface, the heat-absorption member 3 is disposed in the shape of a line in the axial direction (namely, the direction of the length). In other words, this is a line-focussing type heat-absorption apparatus B'. In this apparatus, any deviation of the focus due to possible day-after-day change in the angle to elevation of the direction of the solar radiant energy E occurs in the axial direction of the reflecting mirror. Thus, the apparatus does not require daily adjustment but suffices with weekly or monthly adjustment for the elimination of such change. It does not suffer from decline of efficiency. Thus, the heat-transfer medium 4 can be elevated to a higher degree of temperature. For use as the heat-absorption unit in the second stage, it is essential that the apparatus be provided with a sun-chasing mechanism designed to warrant the fullest utilization of the solar radiant energy E. The heat-transfer medium 4 which has been elevated to said higher temperature is now forwarded to the heat-absorption apparatus C' in the final stage. It goes without saying that the reflecting mirror 7 in the heat-absorption apparatus B' is not necessarily limited to such cylindrical shape as described above but may be in the shape of a flat plate insofar as it enables the solar radiant energy to be focused in a line.

Figure 11:
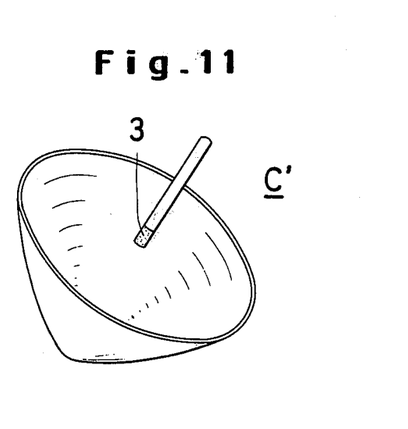

FIG. 11 represents a perspective view of the final-stage heat-absorption apparatus C' adapted to obtain the heat energy of the desired high temperature. It may be in the shape of a convex lens or fresnel lens 5 like the one used in the heat-absorption apparatus illustrated in FIG. 4. Alternatively, it may be formed in the shape of a flat plate so far as the reflecting mirror produces a point focus. In the illustrated embodiment, a parabolic reflecting mirror 8 is disposed as a typical example.

The illustrated design is characterized in that the solar radiant energy E which is reflected by the parabolic reflecting mirror 8 is focussed to one small point. Since only the forward end of the heat-absorption member 3 is exposed to serve as the surface for heat absorption and the remaining portion thereof is covered with a heat-insulation material, the area of the heat-absorption member 3 is notably limited. The heat-absorption member 3 of this construction can obtain heat energy of still higher temperature because the heat-transfer medium 4 is delivered to said surface for heat-absorption and the reflected solar radiant energy E is concentrated at this point. On the other hand, however, the point-focussing type heat-absorption apparatus is inevitably required to be provided with a sun-chasing mechanism of high precision enough to prevent said point focus from deviating from the fixed point on said surface for heat-absorption owing to the change in the angle to elevation of the direction of the solar radiant energy E with lapse of time. While the focus formed in the heat-absorption apparatus B' for use in the second stage is tolerated to deviate in the axial direction of the reflecting mirror, the focus formed in the case of the heat-absorption apparatus C' is not allowed to deviate from the fixed point in any direction. This means that this apparatus requires the sun-chasing to be effected in the three dimensions of X, Y and Z. As already described, the selectively penetrating membranes for use in these heat-absorption apparatuses are required to be capable of reflecting radiant electromagnetic energies of magnitudes corresponding to the respective degrees of temperature rated for the different stages concerned.

Figure 12:
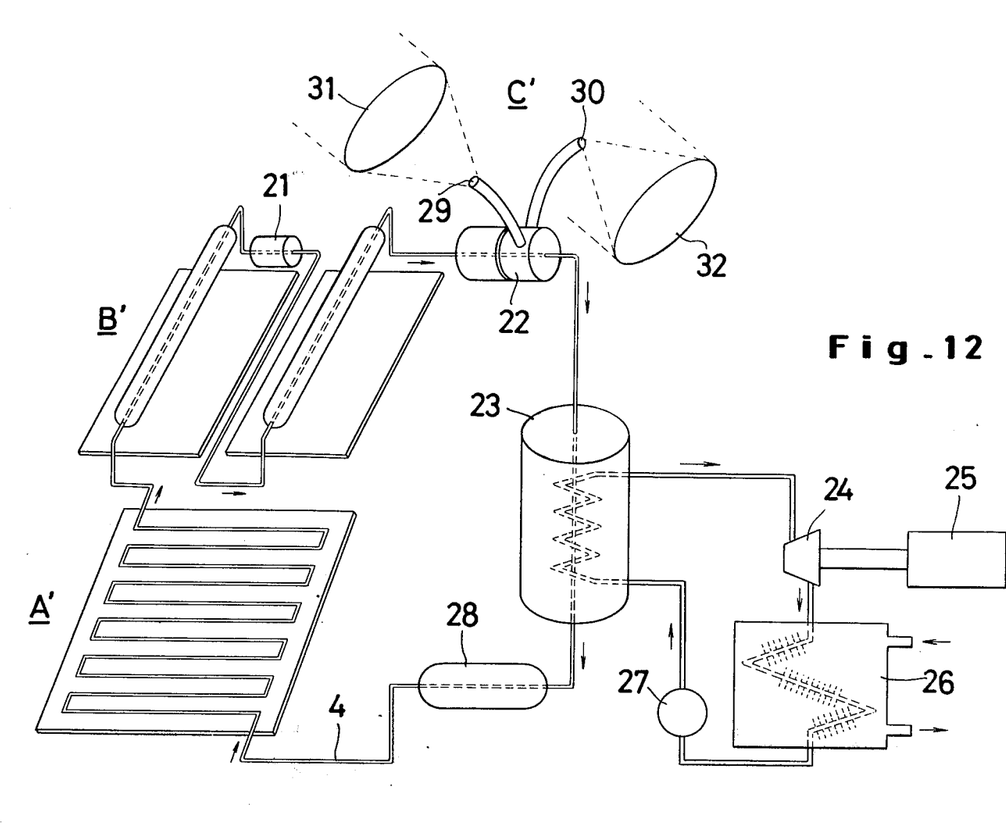
FIG. 12 is a schematic diagram illustrating a complete system for practicing the heat accumulation contemplated by the present invention.

FIG. 12 is one preferred embodiment of the present invention, illustrating the layout of a multi-stage system. In the diagram, A', B', and C' stand respectively for the heat-absorption apparatuses described above, 21 and 22 for heat accumulators, 23 for a heat accumulator and exchanger, 24 for a turbine, 25 for a generator, 26 for a condenser, 27 and 28 for pumps, 29 and 30 for heat-absorption members composing the point-focussing type heat-absorption apparatus C', 31 for a convex lens or fresnel lens and 32 for a parabolic reflecting mirror adapted to form a point focus.

The operation of this system will be explained. The heat-transfer medium 4 is preheated by the heat-absorption apparatus A' and forwarded to the heat-absorption apparatus B' in the subsequent stage, wherein it is further heated. At this time, part of the heat energy is stored in the heat accumulator 21 for the purpose of precluding possible variation of the output due to temporary clouding of the sky. There are installed two heat-absorption apparatuses B'. The heat-transfer medium 4 which has flowed through the heat accumulator 21 advances via the latter heat-absorption apparatus B' into the heat accumulator 22. To the heat accumulator 22 are delivered the heat energy which the heat-absorption member 29 has obtained from the heat-absorption apparatus C' using the convex lens or fresnel lens 31 and the heat energy which the heat-absorption member 30 has acquired from the parabolic reflecting mirror 22. In this heat accumulator 22, the heat-transfer medium 4 reaches the highest degree of temperature and it is forwarded to the subsequent heat accumulator and exchanger 23. Inside the heat accumulator and exchanger 23, the water delivered by the pump 27 is converted into steam of high temperature and high pressure. The steam rotates the turbine 24 to cause the generator 25 to produce electric power. The steam which has worked the turbine 24 is condensed to water in the condenser 26 and is recycled to the heat accumulator and exchanger 23. On the other hand, the heat-transfer medium 4 which has departed from the heat exchanger 23 is again returned to the heat-absorption apparatus A'. Then, the heat-transfer medium 4 is put to circulation by the pump 28.

It should be noted that the system illustrated in FIG. 12 is only representative, and not in the last limitative, of the present invention. Needless to say, it is permissible to adopt line-focussing heat-absorption devices for the apparatuses A' and B' or to select and combine suitable quantities and types of heat-absorption apparatuses A', B' and C' to suit the occasion.

As described in detail above, in the solar radiant energy absorption system utilizing selectively penetrating membranes, the present invention contemplates using selectively penetrating membranes the properties of which are varied so as to be optimum for the respective extents of temperature elevation rated for the heat-transfer medium at different stages of heat absorption, so that the energy which constantly attempts to escape to the exterior of the system can be reflected by said membranes to entrapped within the system. Thus, the system according to this invention enables the solar radiant energy to be converted quite efficiently into heat by means of the heat-transfer medium.

What is claimed is:

1. In a system for the accumulation of the solar radiant energy adapted to have the solar radiant energy absorbed by heat-absorption means and transferred therefrom to a heat-transfer medium for thereby heating said heat-transfer medium, a multi-stage system for the accumulation of the solar radiant energy which comprises:
    a plurality of heat-absorption apparatuses arranged in a series connection and having different selectively penetrating membranes disposed respectively on said heat-absorption apparatuses and possessed of properties suitable for reflecting electromagnetic wave energies of different magnitudes corresponding to ascending degrees of temperature respectively rated for the heat-transfer medium at said plurality of stages.

2. The multi-stage system for the accumulation of the solar radiant energy according to claim 1, wherein said plurality of heat-absorption apparatuses are integrally combined.

3. The multi-stage system for the accumulation of the solar radiant energy according to claim 1 wherein:
    three heat-absorption apparatuses are arranged in a series connection, the first heat-absorption apparatus is provided with a plane-focussing device, the second heat-absorption apparatus is provided with a line-focussing device, the third heat-absorption apparatus is provided with a point-focussing device,
    the first, second and third heat-absorption apparatuses are arranged in said series connection in the order mentioned, whereby the heat-transfer medium is progressively heated in an elevated temperature manner as it travels through said first, second and third heat-absorption apparatuses.

* * * * *